(12) United States Patent
Chung

(10) Patent No.: US 11,412,847 B2
(45) Date of Patent: Aug. 16, 2022

(54) COMBINATION TABLE

(71) Applicant: Plusmofa International Ltd., Miaoli County (TW)

(72) Inventor: Yu-Wei Chung, Miaoli County (TW)

(73) Assignee: PLUSMOFA INTERNATIONAL LTD., Miaoli (TW)

( * ) Notice: Subject to any disclaimer, the term of this patent is extended or adjusted under 35 U.S.C. 154(b) by 0 days.

(21) Appl. No.: 17/140,709

(22) Filed: Jan. 4, 2021

(65) Prior Publication Data
US 2022/0211177 A1   Jul. 7, 2022

(51) Int. Cl.
| A47B 83/02 | (2006.01) |
| F16B 1/00 | (2006.01) |
| A47B 13/00 | (2006.01) |
| A47B 83/04 | (2006.01) |

(52) U.S. Cl.
CPC .......... *A47B 83/021* (2017.08); *A47B 13/003* (2013.01); *A47B 83/045* (2013.01); *F16B 1/00* (2013.01); *F16B 2001/0035* (2013.01)

(58) Field of Classification Search
CPC ......... A47B 85/00; A47B 3/063; A47B 39/00; A47B 83/02; A47B 83/021; A47B 83/0215; A47C 7/622; A47C 7/626; A47C 7/628
USPC ................................ 108/11, 13, 14; 297/140
See application file for complete search history.

(56) References Cited

U.S. PATENT DOCUMENTS

| 2,968,338 | A | * | 1/1961 | Reese | ..................... | A47D 1/004 |
| | | | | | | 297/134 |
| 3,581,318 | A | * | 6/1971 | Kroupa | .................. | A47B 85/00 |
| | | | | | | 5/2.1 |
| 6,174,026 | B1 | * | 1/2001 | Wise | ...................... | A47B 85/00 |
| | | | | | | 108/17 |
| 9,462,796 | B1 | * | 10/2016 | Ellis | ......................... | A47C 7/626 |
| 10,219,622 | B1 | * | 3/2019 | Garner | .................. | A47C 7/006 |
| 11,191,364 | B2 | * | 12/2021 | Nelson | ..................... | B68G 7/05 |
| 2010/0320811 | A1 | * | 12/2010 | Lin | ..................... | A47B 83/0215 |
| | | | | | | 297/143 |
| 2015/0201751 | A1 | * | 7/2015 | Gu | ......................... | A47B 85/06 |
| | | | | | | 108/11 |
| 2017/0332784 | A1 | * | 11/2017 | Huang | ..................... | A47B 5/02 |
| 2021/0030158 | A1 | * | 2/2021 | Newman | ................ | A47C 7/626 |

FOREIGN PATENT DOCUMENTS

| FR | 2611123 | A1 | * | 8/1988 | ............. | A47B 3/087 |
| GB | 2226807 | A | * | 11/1990 | | |

* cited by examiner

*Primary Examiner* — Jose V Chen
(74) *Attorney, Agent, or Firm* — Muncy, Geissler, Olds & Lowe, P.C.

(57) ABSTRACT

A combination table includes a seat, at least two support members, two functional members, at least two combination pieces, a table board, and a cover plate. The seat has a first and a second combination sides oppositely disposed. The support member has a first fix section, a second fix section, and a connection section connected between the first section and the second section, and the first fix section is slidably disposed on the first and second combination sides. The functional members are slidably combined with the second fix section, so that the functional members are suspended above the seat. The combination pieces are fixed on the second fix sections, respectively. The table board has the bottom face thereof attached on the combination pieces. Thus, the assemblies of the present invention are modularized, increasing the convenience of installation.

9 Claims, 9 Drawing Sheets

COMBINATION TABLE

BACKGROUND OF THE INVENTION

1. Field of the Invention

The present invention relates to tables, and more particularly, to a combination table which is structurally modularized, so as to be provided with different functional assemblies according to customer's demand when leaving the factory.

2. Description of the Related Art

A conventional table is usually integrally formed or manufactured with a fixed structure, such as a table formed of log or iron material. Such tables are structurally invariable, unable to be modified or added with functional assemblies according to different user demands.

Also, regarding such conventional tables, the assembly on each combination joints are only applicable on a single position, unable to be applied on other combination joints. As a result, each combination joint requires one type of assemblies, so that the various types of assemblies are needed, and thus increasing the inconvenience and cost of manufacturing and installation.

SUMMARY OF THE INVENTION

For improving the issues above, a combination table is disclosed, which has modularized assemblies for increasing the convenience of installation.

For achieving the aforementioned objectives, combination table in accordance with an embodiment of the present invention is provided, comprising a seat, at least two support members, two functional members, at least two combination pieces, a table board, and a cover plate. The seat has a first combination side and an opposite second combination side, wherein the first combination side and the second combination side comprises at least a first installation groove. Each of the at least two support members has a first fix section, a second fix section, and a connection section connected between the first section and the second section, wherein the first section is arranged in parallel to the second fix section, and the first fix section is slidably disposed in the first installation groove. Each of the two functional members comprises an installation face which has at least a concave second installation groove, with which the second fix section is slidably combined, so that the functional member is suspended above the seat. The at least two combination pieces are fixed on the second fix sections, respectively. The table board has the bottom face thereof attached on the combination pieces.

With such configuration, each assembly of the present invention is manufactured in a modularization manner, so as to increase the convenience of installation and improve the advantage of cost. When the product leaves the factory, other components such as drawer members or other functional assemblies.

DETAILED DESCRIPTION OF THE INVENTION

Figure 1:
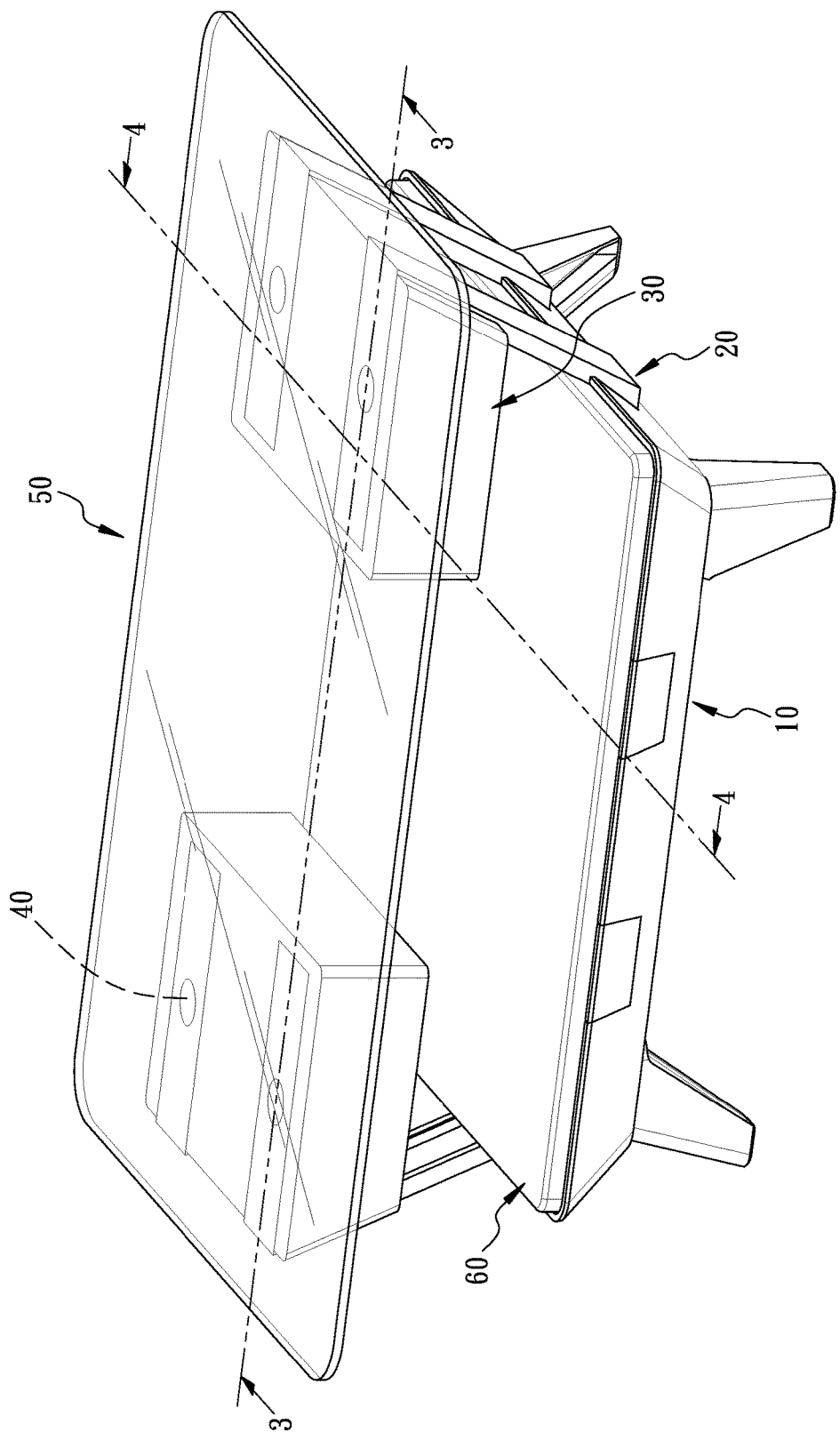
FIG. 1 is a perspective view of a combination table in accordance with the first embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, a combination table 100 in accordance with the first embodiment comprises a seat 10, at least two support members 20, two functional members 30, at least two combination pieces 40, a table board 50, and a cover plate 60.

The seat 10 is formed in an approximate rectangular shape and comprises a top face 11 and a bottom face 12. The bottom face 12 has the four corners thereof each having a table foot 13 fastened thereto. The top face 11 comprises a first combination side 14 and an opposite second combination side 15. Each of the first combination side 14 and the second combination side 15 has is formed with at least a first installation groove 16 opened thereon. In the embodiment, the first combination side 14 has two first installation grooves 16, and the second combination side 15 has two first installation grooves 16, wherein the first installation grooves 16 are formed in an elongate shape. Therein, one end of the first installation groove 16 is open on an outer side, and the other end of the first installation groove 16 extends into the seat 10. In addition, the top face 11 of the seat 10 has the four corners thereof each provided with a first engagement portion 17 and the middle position thereof provided with a plurality of engagement grooves 18.

Figure 2:
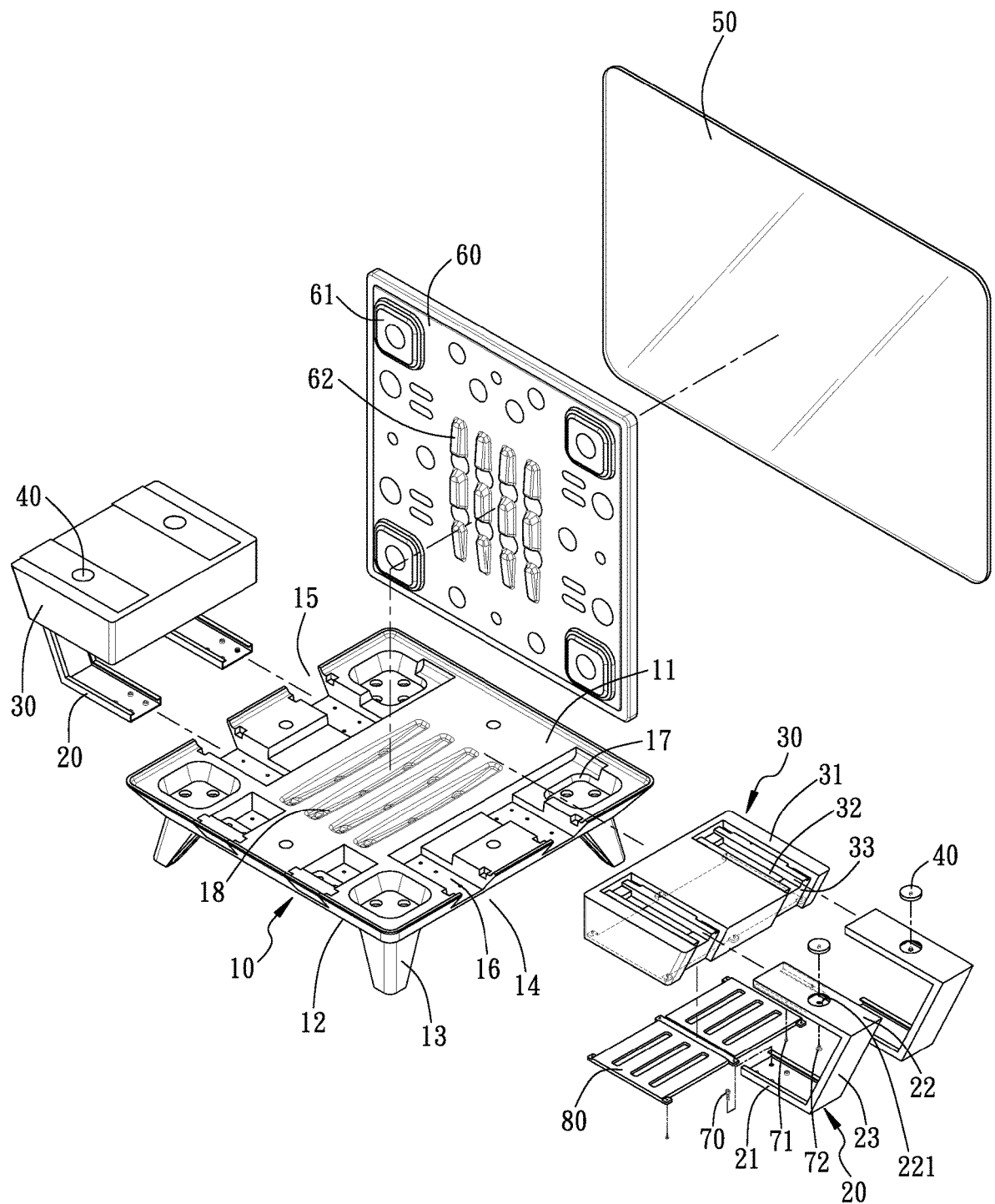
FIG. 2 is an exploded view of the combination table in accordance with the first embodiment of the present invention.
Figure 3:
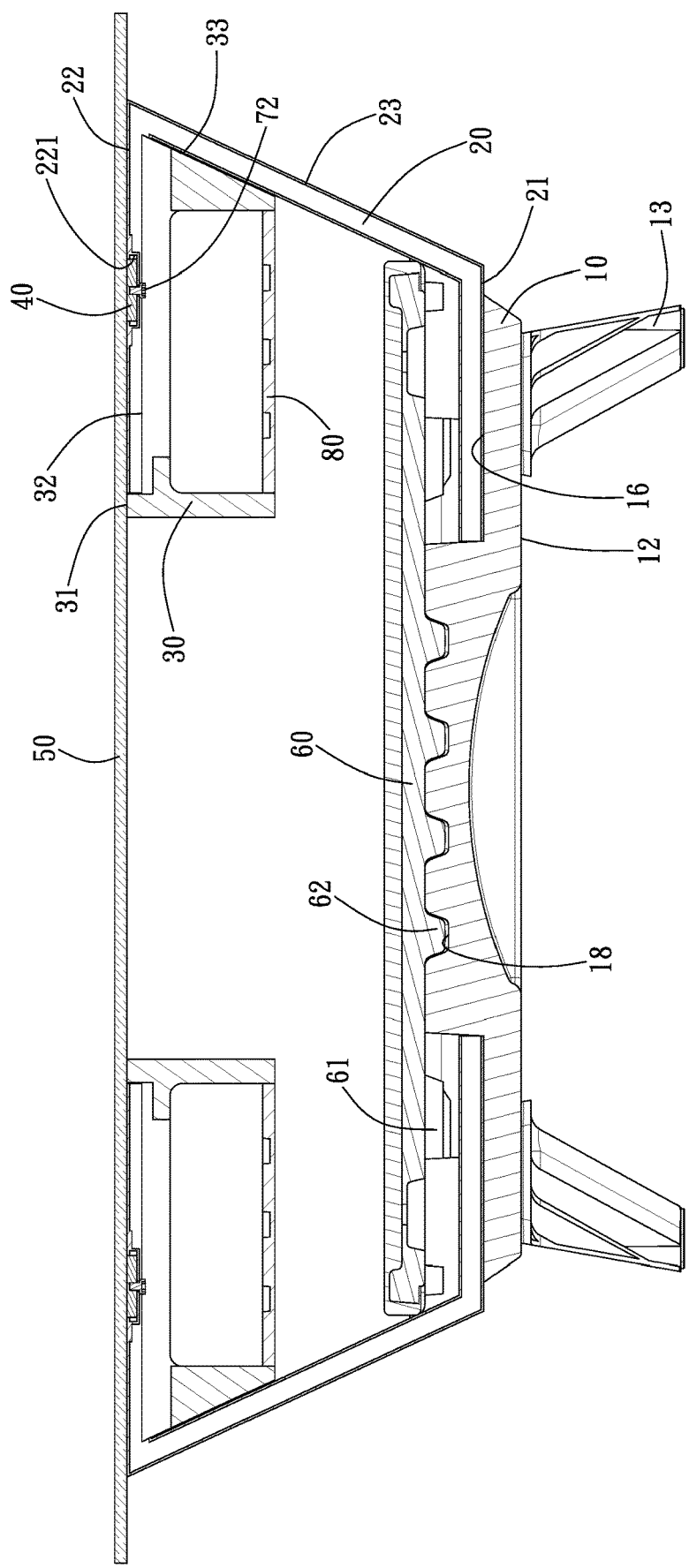
FIG. 3 is a cross-sectional view taken along line 3-3 in FIG. 1.
Figure 4:
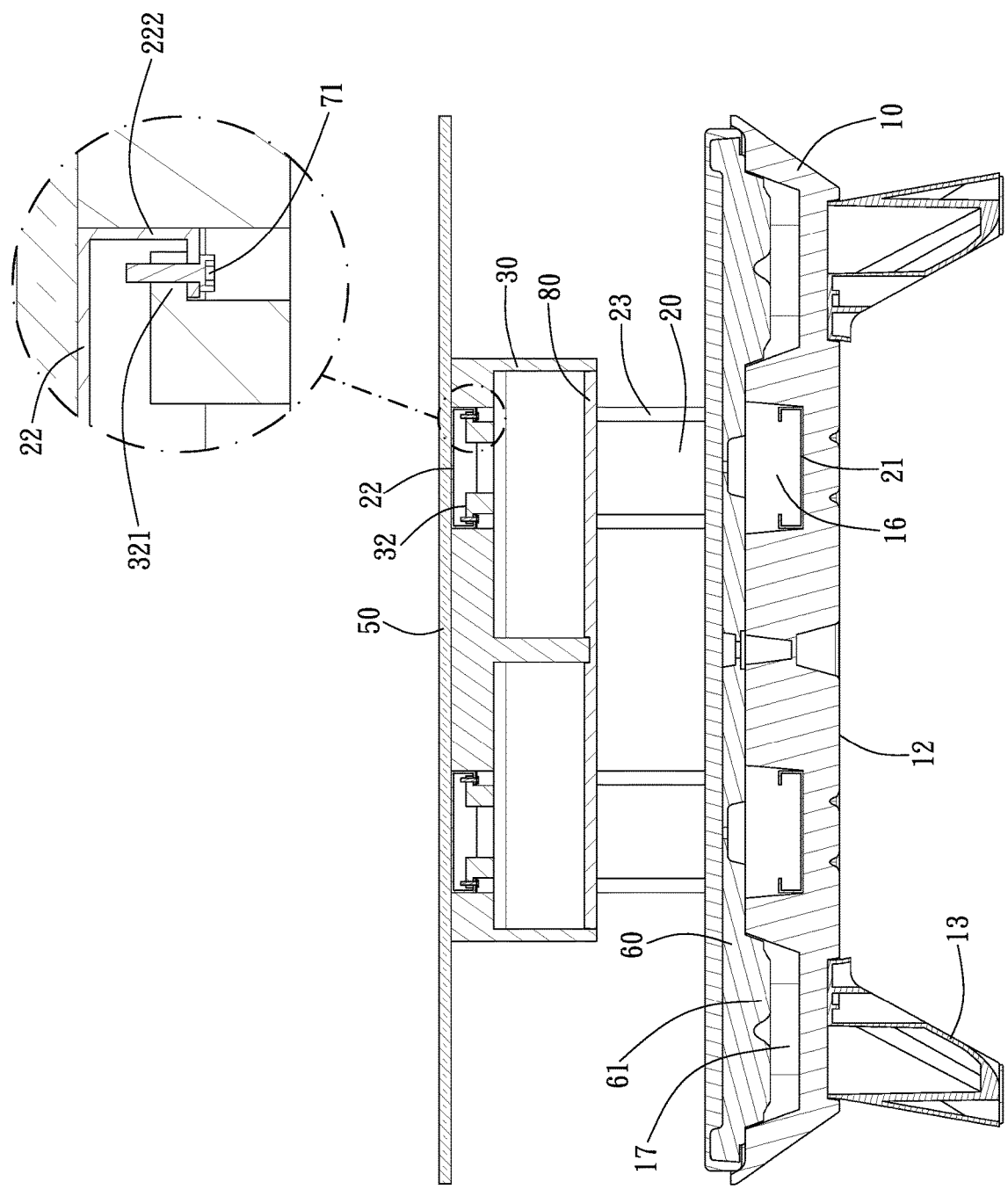
FIG. 4 is a partially enlarged cross-sectional view taken along line 4-4 in FIG. 1.

The at least two support members 20 are formed of a metal material as a U shaped frame, such that the weight of the support members 20 are reduced. The support member 20 comprises a first fix section 21, a second fix section 22, and a connection section 23 connected between the first fix section 21 and the second fix section 22, wherein the first fix section 21, the second fix section 22, and the connection section 23 have identical sectional faces and are all formed in a hollow frame shape. As shown by FIG. 2, in the embodiment, four support members 20 are included. However, in other embodiments, the amount of support members 20 are allowed to be two, such that the two support members 20 are disposed on the first combination side 14 and the second combination side 15, respectively. The first fix section 21 and the second fix section 22 are arranged in parallel. The first fix section 21 and the second fix section 22 extend toward a same direction with respect to the connection section 23. Also, the connection section 23 is connected between the first fix section 21 and the second fix section 22 at an angle, and the angle is equal or similar to an angle of the periphery of the seat 10. The first fix section 21 is slidably disposed in the first installation groove 16 such that the second fix section 22 is positioned above the seat 10, and the first fix section 21 is fixed to the seat 10 through a first screw 70. After combination, the connection section 23 of each support member 20 is on an outer side of the seat 10. In other words, the portion of the first fix section 21 connected with the connection section 23 of the support member 20 is mostly arranged on the outer side of the seat 10.

Each second fix section 22 comprises a circular recess 221, and has an L-shaped first block portion 222 disposed on two sides along the length direction thereof.

Each functional member 30 comprises an installation face 31 having at least a second installation groove 32 concavely disposed thereon, such that the second fix section 22 is slidably combined in the second installation groove 32, with a space gap formed between the functional member 30 and the seat 10, whereby the functional member 30 is suspended above the seat 10. In the embodiment, the functional member 30 is allowed to be a decoration or provided with a housing space for housing or holding objects. The amount of the second installation grooves 32 is equal to the amount of the support members 20. In the embodiment, the amounts thereof are four. Two sides of the second installation groove 32 is provided with an L-shaped second block portion 321, respectively, so that when the second fix section 22 is disposed in the second installation groove 32, the first block portion 222 abuts against the second block portion 321, whereby the two components are stable combined and positioned. For meeting the assembling requirement, a second screw 71 is applied for passing upward from the lower side of the functional member 30, so as to enhance the combination effect of the components. Further, one side of the installation face 31 is provided with a side groove 33 which is in communication with the second installation groove 32 at an angle for housing the connected section 23 of the support member, realizing a relatively smooth appearance after combination.

The two combination pieces 40 are disposed in the recess 221 of the second fix section 22, respectively. In the embodiment, four combination pieces are included. The combination piece 40 is a magnetic body to be magnetically attached to the support member 20, so as to be stably positioned in the recess 221. Also, for stable combination, a third screw 72 is applied for screwing the combination piece 40 in the recess 221.

The table board 50 is formed of a glass material, with the bottom face of the table board 50 adhered on each combination piece 40, such that the table board 50 is positioned on each support member 20. Therein, the amount of the table board 50 can be one. Alternatively, there can be one table board 50 disposed on each functional member 30 on the first combination side 14 and the second combination side 15.

The cover plate 60 is disposed on the top face 11 of the seat 10 and under the table board 50, so that the cover plate 60 covers the top face 11 and simultaneously covers the first fix section 21 of the support member 20, such that a housing space is formed under the table board 50 and above the seat 10. Also, the cover plate 60 achieves an aesthetically covering function, and also provides an object placement space for holding objects, thereby improving the functions of the combination table 100. Therein, the bottom face of the cover plate 60 comprises a second engagement portion 61 correspondingly combined with the first engagement portion 17, and also comprises a plurality of engagement strips 62 correspondingly combined with the engagement grooves 18, so that the cover plate 60 is positioned on the seat 10 in a concave-convex engagement.

Notably, in the embodiment, the functional member 30 is hollow, with the bottom portion thereof open and sealed by a seal member 80.

Therefore, the assemblies of the present invention are manufactured in a modularization manner, and each support member 20 is applicable to both the first combination side 14 and the second combination side 15. In other words, the support member 20 is not limited to specific installation position, increasing the convenience of installation and lowering the manufacturing cost.

Figure 5:
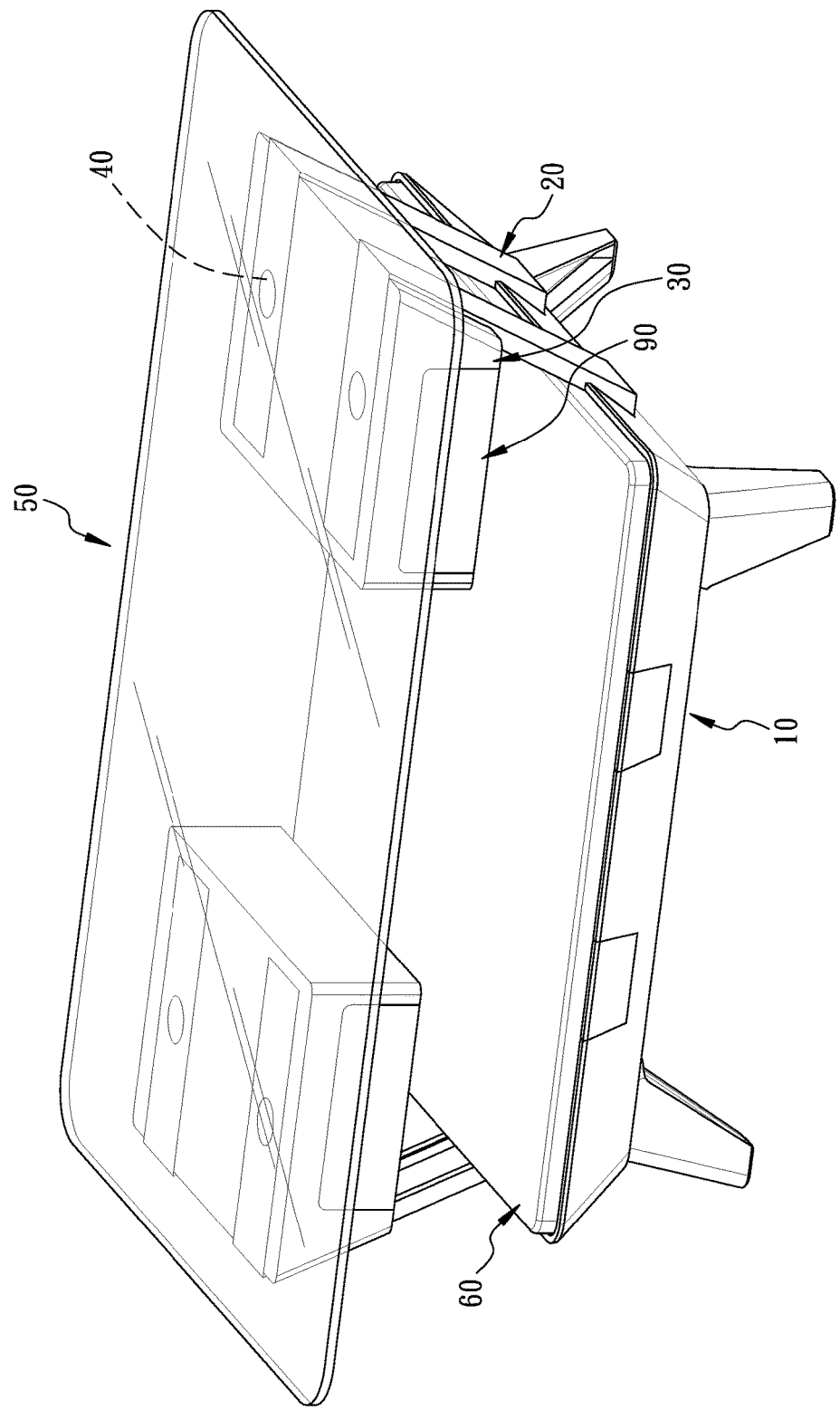
FIG. 5 is a perspective view of a combination table in accordance with the second embodiment of the present invention.
Figure 6:
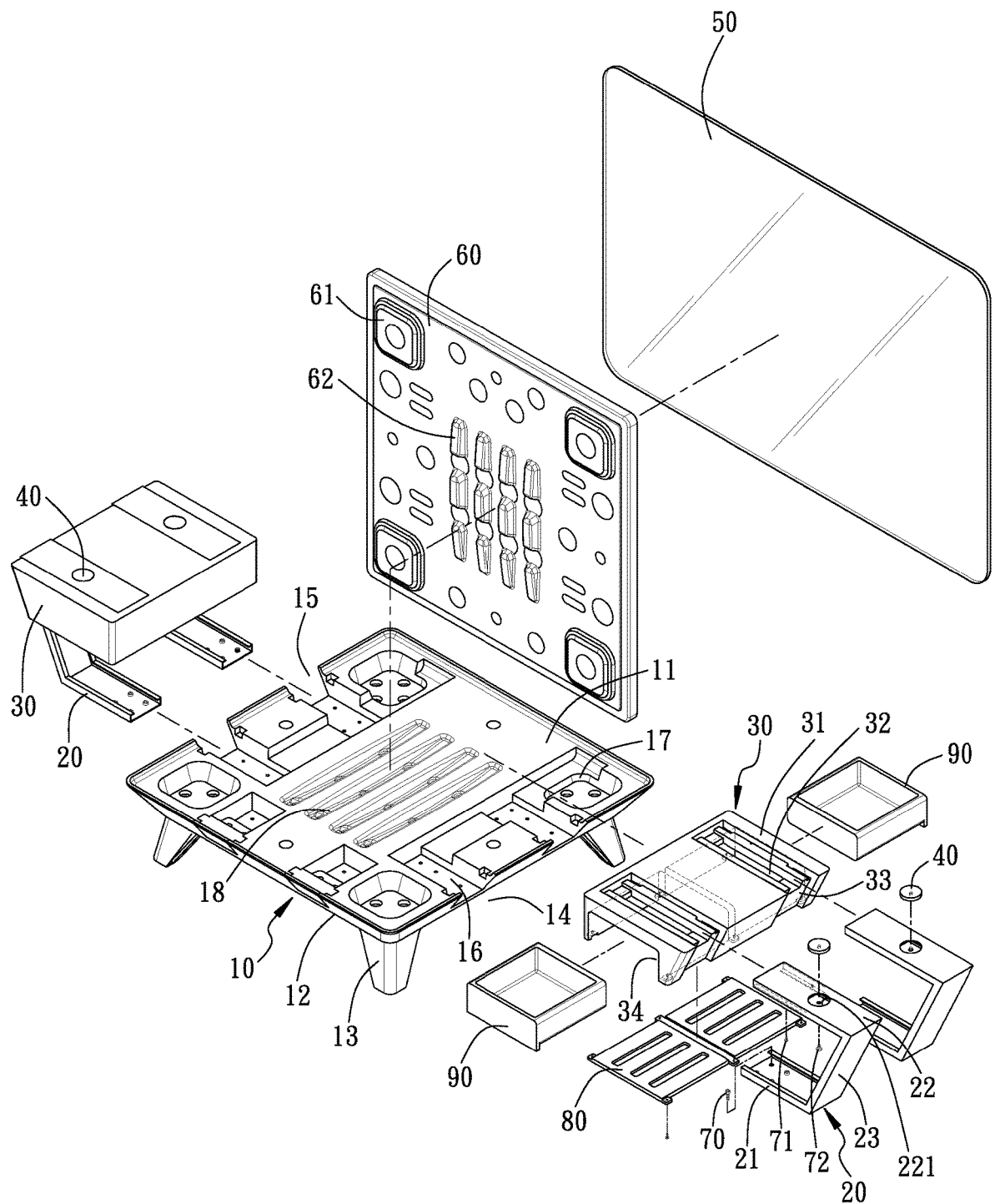
FIG. 6 is an exploded view of the combination table in accordance with the second embodiment of the present invention.
Figure 7:
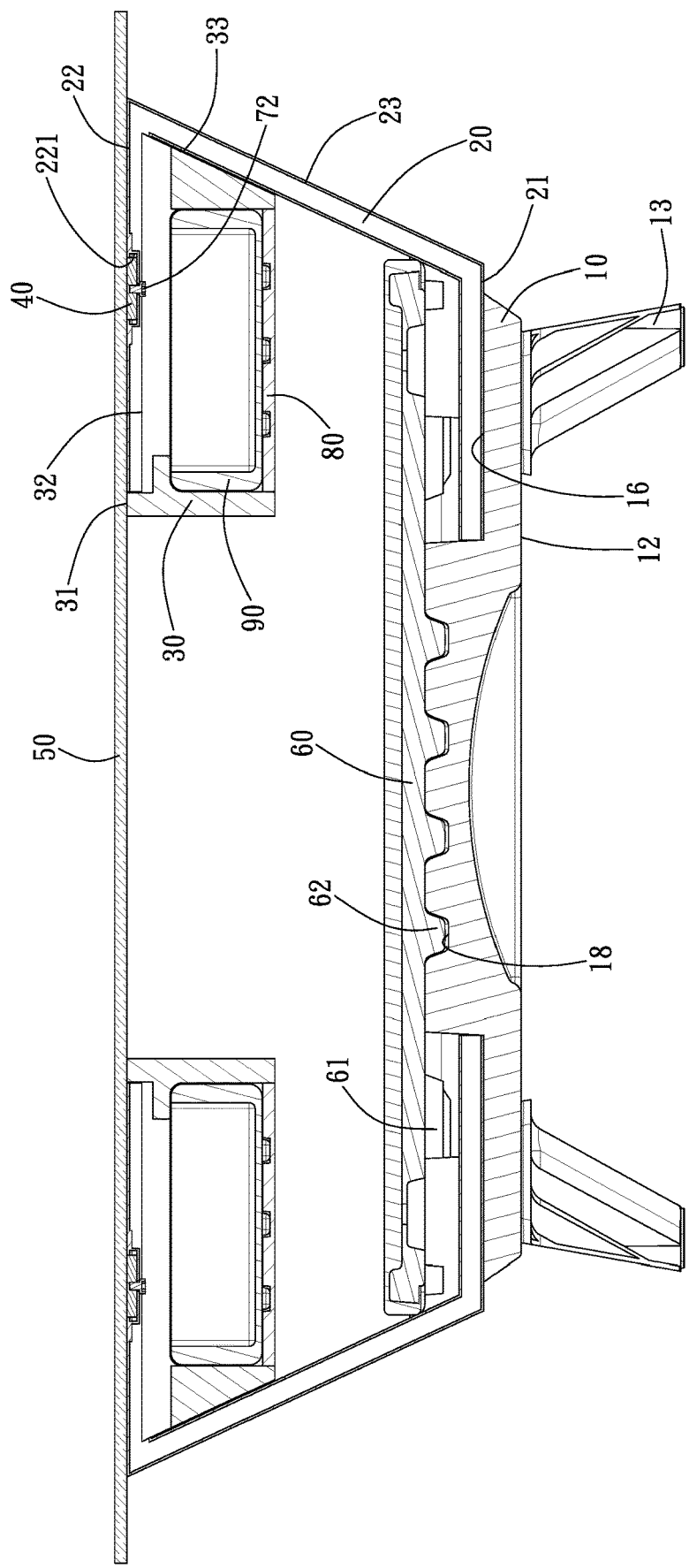
FIG. 7 is a sectional view of the combination table in accordance with the second embodiment of the present invention.

Referring to FIG. 5 to FIG. 7, the second embodiment of the present invention are disclosed, wherein the reference numbers identical in the first and second embodiments represent identical components, structures, and functions, therefore being omitted. In the second embodiment, an open slide groove 34 is disposed on one side of the functional member 30 away from the side groove 33, such that a drawer member 90 is slidably disposed in the slide groove 34. Also, in the embodiment, each functional member 30 still comprises the seal member 80 for covering the bottom portion of the functional member 30 for covering the drawer member 90 to meet the aesthetic demand. Therein, each functional member 30 has two drawer members 90 disposed on two sides thereof, respectively, providing an object housing function.

Figure 8:
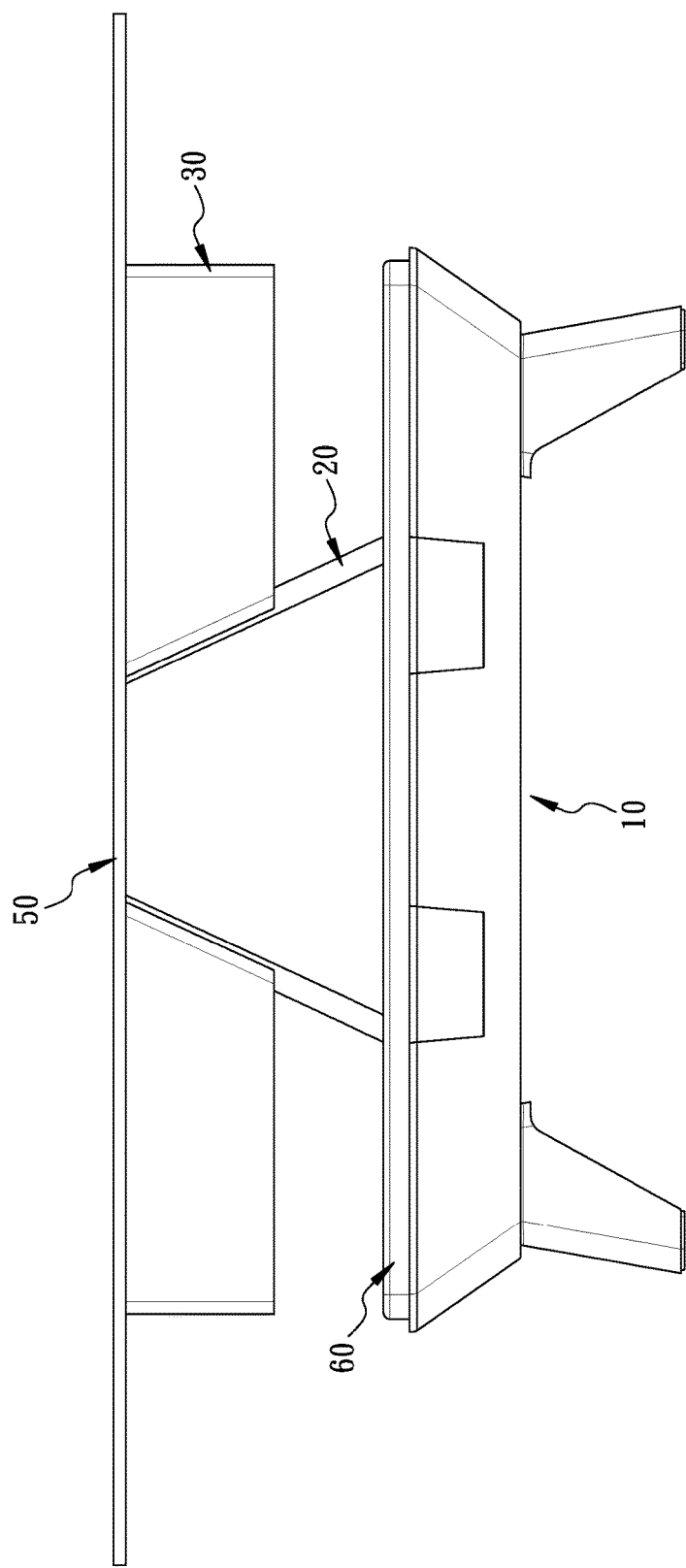
FIG. 8 is a side view of the combination table in accordance with the third embodiment of the present invention.

Referring to FIG. 8, the third embodiment is disclosed, which is similar to the first embodiment, wherein the difference only lies in that the support member 20 is combined with the functional member 30 in a different direction with respect to the seat 10. In other words, each support member 20 is combined with the seat 10 in a reverse direction, wherein each connection section 23 is positioned on the inner side of the seat 10, so that the portion of the first fix section 21 connected with the connection section 23 is mostly arranged on the inner side of the seat 10. Therefore, a different appearance is provided after combination, and still achieves the aforementioned functions.

Figure 9:
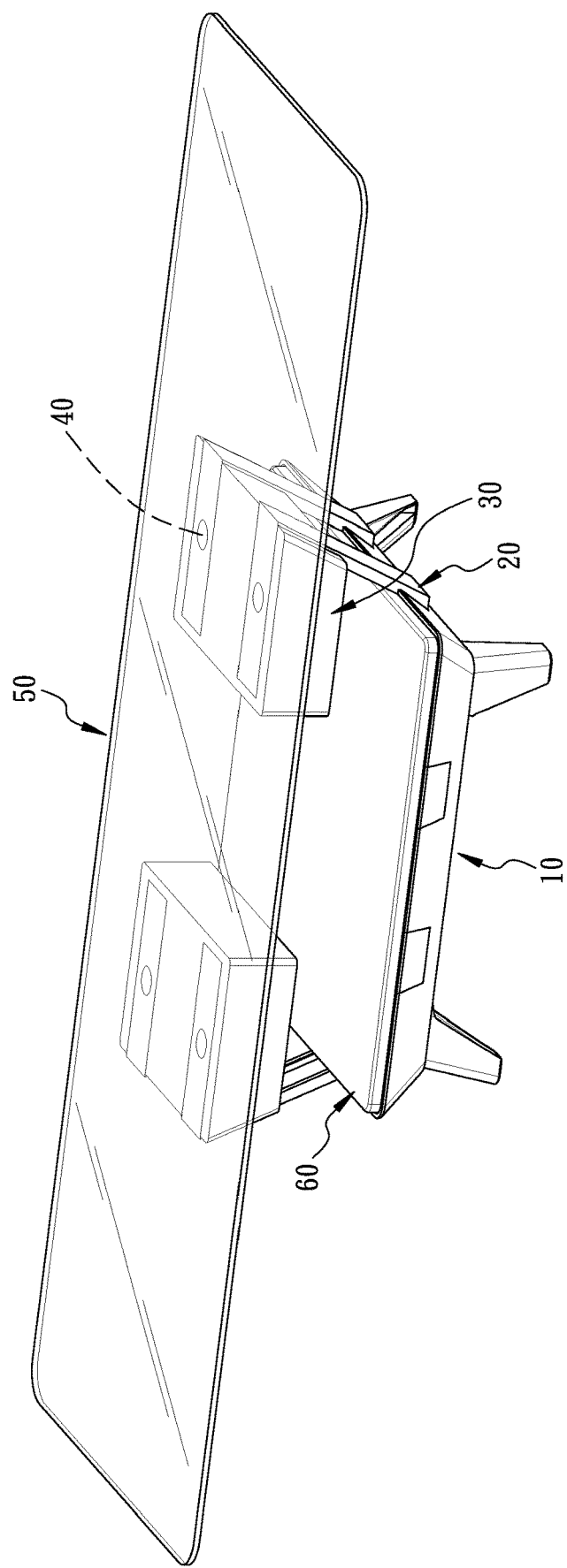
FIG. 9 is a perspective view of a combination table in accordance with the fourth embodiment of the present invention.

Referring to FIG. 9, the fourth embodiment of the present invention is provided, which is similar to the first embodiment, wherein the difference only lies in that a table board 50 with a relatively larger area is applied.

Therefore, the assemblies of the present invention are manufactured in a modularization manner, increasing the convenience of installation and lowering the manufacturing cost. Also, drawer members 90 or other components are allowed to be added according to user demands.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A combination table, comprising:
   a seat having a first combination side and an opposite second combination side, the first combination side and the second combination side being formed with at least a first installation groove opened thereon, respectively, one end of the first installation groove being open on an outer side, and another end of the first installation groove extending into the seat;

at least two U-shaped support members each having a first fix section, a second fix section, and a connection section connected between the first fix section and the second fix section, the first fix section and the second fix section arranged in parallel, the first fix section slidably disposed in the first installation groove, the second fix section being positioned above the seat;

two functional members each having an installation face, the installation face comprising at least a second installation groove, the second fix section being slidably combined with the second installation groove, and a space gap being formed between the functional member and the seat, so that the functional member being suspended above the seat;

at least two combination pieces fixed to the second fix section of the at least two support members, respectively; and a table board attached on the combination pieces.

2. The combination table of claim 1, wherein each combination piece is magnetic, and each support member is formed of metal material, so that the combination pieces are magnetically attached to the support members.

3. The combination table of claim 2, wherein each second fix section comprises a recess for housing the corresponding combination piece.

4. The combination table of claim 3, wherein the first fix section and the second fix section extend in an identical direction with respect to the connection section.

5. The combination table of claim 1, wherein two sides of the second installation groove are in communication with an L-shaped second block portion, each second fix section comprises an L-shaped first block portion disposed on two sides along a length direction thereof for abutting against the second block portion.

6. The combination table of claim 5, wherein the connection section is connected with the first fix section and the second fix section at an angle, and one side of the installation face comprises a side groove connected with the second installation groove at an angle for housing the connection section therein.

7. The combination table of claim 1, wherein each functional member comprises an open slide groove on one side, such that a drawer member is slidably disposed in the slide groove.

8. The combination table of claim 1, wherein the seat comprises a top face and a bottom face, and the seat further comprises a cover plate disposed on the top face and under the table board, such that the cover plate covers the top face, and simultaneously covers the first fix section.

9. The combination table of claim 1, wherein each of the first combination side and the second combination side has two first installation grooves; the support members and the combination pieces are provided in an amount of four; and the second installation grooves are provided in an amount of four.

* * * * *